US009185088B1

(12) United States Patent
Bowen

(10) Patent No.: US 9,185,088 B1
(45) Date of Patent: Nov. 10, 2015

(54) SECURE AND EFFICIENT COMMUNICATION THROUGH AN INTERMEDIARY

(71) Applicant: Amazon Technologies, Inc., Reno, NV (US)

(72) Inventor: Peter Zachary Bowen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 13/770,040

(22) Filed: Feb. 19, 2013

(51) Int. Cl.
H04L 29/00 (2006.01)
H04L 29/06 (2006.01)

(52) U.S. Cl.
CPC ........ *H04L 63/0471* (2013.01); *H04L 63/0464* (2013.01)

(58) Field of Classification Search
None
See application file for complete search history.

(56) References Cited

U.S. PATENT DOCUMENTS

| 7,219,223 | B1 * | 5/2007 | Bacchus et al. | 713/150 |
|---|---|---|---|---|
| 7,853,782 | B1 * | 12/2010 | Geddes | 713/151 |
| 8,352,728 | B2 * | 1/2013 | Suganthi et al. | 713/153 |
| 8,438,628 | B2 * | 5/2013 | Shah et al. | 726/12 |
| 8,504,822 | B2 * | 8/2013 | Wang et al. | 713/156 |
| 8,566,822 | B2 * | 10/2013 | Diab et al. | 718/1 |
| 8,681,975 | B2 * | 3/2014 | Farrugia et al. | 380/42 |
| 2002/0035685 | A1 * | 3/2002 | Ono et al. | 713/155 |
| 2003/0046532 | A1 * | 3/2003 | Gast | 713/151 |
| 2005/0244007 | A1 * | 11/2005 | Little et al. | 380/270 |
| 2008/0059789 | A1 * | 3/2008 | Lucidarme | 713/153 |
| 2009/0031424 | A1 * | 1/2009 | Ganesan et al. | 726/26 |
| 2009/0119504 | A1 * | 5/2009 | van Os et al. | 713/153 |
| 2010/0095127 | A1 * | 4/2010 | Banerjee et al. | 713/179 |
| 2010/0095217 | A1 * | 4/2010 | Kang | 715/738 |
| 2010/0177899 | A1 * | 7/2010 | Bucklin et al. | 380/270 |
| 2011/0194563 | A1 * | 8/2011 | Shen et al. | 370/395.52 |
| 2013/0104124 | A1 * | 4/2013 | Tsirkin et al. | 718/1 |
| 2014/0164760 | A1 * | 6/2014 | Hybertson | 713/153 |

* cited by examiner

*Primary Examiner* — Minh Dinh
*Assistant Examiner* — Wayne An
(74) *Attorney, Agent, or Firm* — Baker & Hostetler LLP

(57) ABSTRACT

Techniques are disclosed for secure and efficient communication from a source to a destination through an intermediary. The disclosed techniques employ a source-to-intermediary encryption algorithm to encrypt the communication from the source to the intermediary. The disclosed techniques also employ an intermediary-to-destination encryption algorithm to encrypt the communication from the intermediary to the destination. Thus, a more optimal encryption algorithm may be employed for communication between the intermediary and the destination, even if the more optimal encryption algorithm is not supported by the source. Also, a more optimal encryption algorithm may be employed for communication between the source and the intermediary, even if the more optimal encryption algorithm is not supported by the destination.

12 Claims, 14 Drawing Sheets

| Source Supported Algorithms List 101 |
|---|
| S |
| X |

| Intermediary Supported Algorithms List 111 |
|---|
| I |
| A |
| B |
| D |
| S |

| Destination Supported Algorithms List 112 |
|---|
| D |
| A |
| B |
| I |
| S |

| Priorities 500 |
|---|
| Preferred Encryption Algorithm at Destination |

| 105 | Source-to-Intermediary Encryption Algoritihm = S |
|---|---|
| 115 | Intermediary-to-Destination Encryption Algorithm = D |

FIG. 5

| Source Supported Algorithms List 101 |
|---|
| S |
| X |

| Intermediary Supported Algorithms List 111 |
|---|
| I |
| A |
| B |
| D |
| S |

| Destination Supported Algorithms List 112 |
|---|
| D |
| A |
| B |
| I |
| S |

| Priorities 600 |
|---|
| Preferred Encryption Algorithm at Intermediary |

| 105 | Source-to-intermediary Encryption Algorithm = S |
|---|---|
| 115 | Intermediary-to-Destination Encryption Algorithm = I |

FIG. 6

| Source Supported Algorithms List 101 |
|---|
| S |
| X |

| Intermediary Supported Algorithms List 111 |
|---|
| I |
| A |
| B |
| D |
| S |

| Destination Supported Algorithms List 112 |
|---|
| D |
| A |
| B |
| I |
| S |

| Priorities 700 |
|---|
| Preferred Encryption Algorithm Across Intermediary and Destination (Lowest Average Rank) |

| 105 | Source-to-intermediary Encryption Algoritihm = S |
|---|---|
| 115 | Intermediary-to-Destination Encryption Algorithm = A |

FIG. 7

| Source Supported Algorithms List 101 |
|---|
| S |
| X |

| Intermediary Supported Algorithms List 111 |
|---|
| I |
| A |
| B |
| D |
| S |

| Destination Supported Algorithms List 112 |
|---|
| D |
| A |
| B |
| I |
| S |

| Priorities 800 |
|---|
| Minimize the Amount of Encryption/Decryption Operations Across Source, Intermediary and Destination |

| 105 | Source-to-Intermediary Encryption Algorithm = S |
| 115 | Intermediary-to-Destination Encryption Algorithm = S |

FIG. 8

SECURE AND EFFICIENT COMMUNICATION THROUGH AN INTERMEDIARY

BACKGROUND

Many conventional communications systems employ an intermediary to improve efficiency of communications between a source and a destination. As a common example, a load balancer may be employed as an intermediary to evenly distribute a communications traffic load across a number of destination components. In addition to employing such intermediaries, another increasingly common characteristic of conventional communications systems is that such systems may often employ "end-to-end" encryption techniques, which require that data transmitted from a source to a destination remain encrypted throughout its complete path from the source to the destination. In particular, if an intermediary is employed, end-to-end encryption may require encryption of a communication both from the source to the intermediary and from the intermediary to the destination. Some conventional techniques accomplish such end-to-end encryption by employing a single encryption technique supported by both the source and the destination. The single encryption technique is used across the complete communications path from the source to the destination through the intermediary.

BRIEF DESCRIPTION OF THE DRAWINGS

FIG. 5 is a diagram illustrating an example encryption algorithm selection scenario in accordance with the present disclosure.

FIG. 6 is a diagram illustrating another example encryption algorithm selection scenario in accordance with the present disclosure.

FIG. 7 is a diagram illustrating another example encryption algorithm selection scenario in accordance with the present disclosure.

FIG. 8 is a diagram illustrating another example encryption algorithm selection scenario in accordance with the present disclosure.

DETAILED DISCLOSURE

In general, this disclosure describes techniques for secure and efficient communication from a source to a destination through an intermediary. The disclosed techniques employ a source-to-intermediary encryption algorithm to encrypt the communication from the source to the intermediary. The disclosed techniques also employ an intermediary-to-destination encryption algorithm to encrypt the communication from the intermediary to the destination. The source-to-intermediary encryption algorithm may be different from the intermediary-to-destination encryption algorithm. Thus, the disclosed techniques may enable a more optimal encryption algorithm to be employed for communication between the intermediary and the destination, even if the more optimal encryption algorithm is not supported by the source. On the other hand, the disclosed techniques may also enable a more optimal encryption algorithm to be employed for communication between the source and the intermediary, even if the more optimal encryption algorithm is not supported by the destination.

Figure 1:
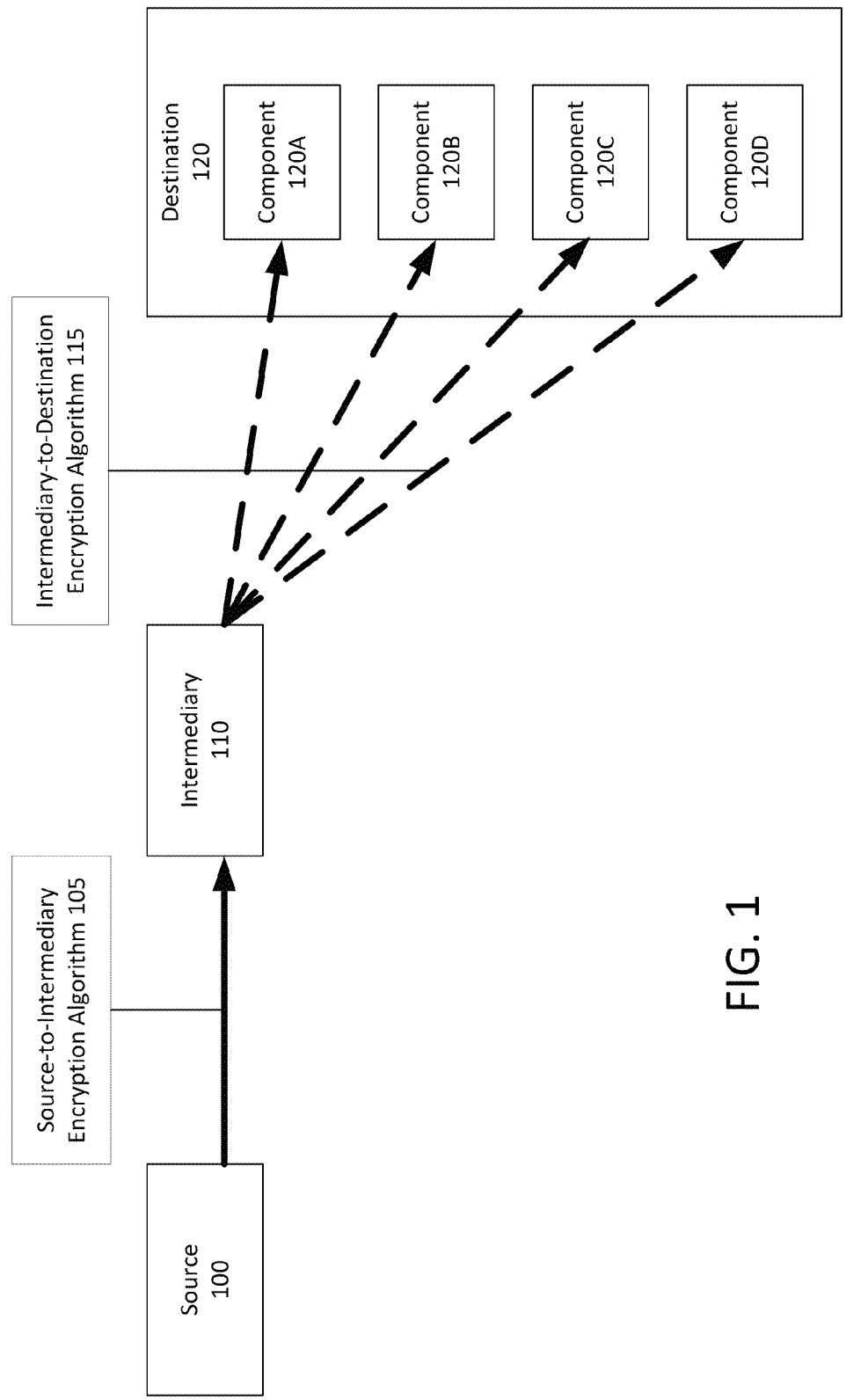
FIG. 1 is a diagram illustrating an example encrypted communications system in accordance with the present disclosure.

FIG. 1 illustrates one example embodiment of an encrypted communications system in accordance with the present disclosure. FIG. 1 illustrates source 100 in communication with destination 120 through an intermediary 110. Destination 120 includes destination components 120A-D. As should be appreciated, a system that employs the disclosed techniques may include any number of source, intermediary and/or destination components. Depending upon the particular system being employed, any or all of components 100, 110 and 120A-D may be on the same device as one another or on separate devices. Components 100, 110 and 120A-D may also include any number of groups or sub-groups and may include or span any number of geographic locations at any distance from one another. In one example, the source, intermediary and destination components may each be remote from one another and may communicate using a wide area network (WAN) such as the Internet. In other examples, the source may communicate with the intermediary using the Internet, but the intermediary and destination components may communicate using a local area network (LAN). In yet other examples, all of the components may communicate using a LAN or home network or may even be included on a single device. Any number of configurations may be employed using any type or number of devices and/or networks.

Many communications systems in accordance with the present disclosure may include large quantities of source components initiating large quantities of communications with the destination components. In such high volume systems and in other systems, it may be particularly important to ensure that the communications load is evenly distributed across each of the destination components. Thus, one example function of intermediary 110 may be to balance the communications load across each of destination components 120A-D. Intermediary 110 may also direct incoming communications to a selected destination component based on other factors. For example, if the destination components include differing attributes or capabilities, the intermediary may direct the communications by determining a particular destination component that is best suited to handle or process the communications. Additionally, intermediary 110 may direct a request to particular destination components based on factors such as time of day, geographic location and any number of other relevant factors. For example, incoming communications may be more heavily routed to destination components in the United States during typical United States business hours, while incoming communications may be more heavily routed to destination components in India during typical Indian business hours.

The system depicted in FIG. 1 may employ any number of various cryptographic protocols and other techniques to secure communication between various components. For example, for Internet-based communications, commonly employed cryptographic protocols may include Transport Layer Security (TLS) and Secure Sockets Layer (SSL), which are commonly referred to collectively as TLS/SSL. Many of these cryptographic protocols and other security techniques involve the use of one or more encryption algorithms to encrypt data communicated between devices or components. The term encryption algorithm, as used herein, refers to any cipher, code or other technique used to encrypt communications. Such encryption algorithms may include, for example, Advanced Encryption Standard (AES), Data Encryption Standard (DES), RC4, Blowfish and many others.

The use of many conventional encryption algorithms requires significant computer processing power. To help reduce the required processing power, many newer systems have implemented certain encryption algorithms in hardware, allowing the total processing time to be reduced by an order of magnitude. However, not all systems are capable of implementing the same, or even any, encryption algorithms in hardware. Additionally, due to other limitations, many systems may not be as efficient as others with respect to performing various encryption algorithms. For example, certain systems may not include software or processing power required to efficiently support certain encryption algorithms. Additionally, many systems simply may not be privy to the codes and/or algorithms required to perform various encryption algorithms. As an analogy, many French speakers likely have the intellectual capability required to also speak Spanish, but may not be capable of speaking Spanish because they have never been trained to do so. Thus, for these and various other reasons, certain components or devices are simply more efficient or capable than others with respect to performing certain encryption algorithms.

One way in which the present disclosure provides enhanced efficiency for secure communications is by employing a source-to-intermediary encryption algorithm 105 for use between source 100 and intermediary 110 and an intermediary-to-destination encryption algorithm 115 for communications between intermediary 110 and destination 120. The source-to-intermediary encryption algorithm 105 may be different from the intermediary-to-destination encryption algorithm 115. Thus, the disclosed techniques may enable a more optimal encryption algorithm to be employed for communication between the intermediary 110 and the destination 120, even if the more optimal encryption algorithm is not supported by the source 100. On the other hand, the disclosed techniques may also enable a more optimal encryption algorithm to be employed for communication between the source 100 and the intermediary 110, even if the more optimal encryption algorithm is not supported by the destination 120.

Figure 2:
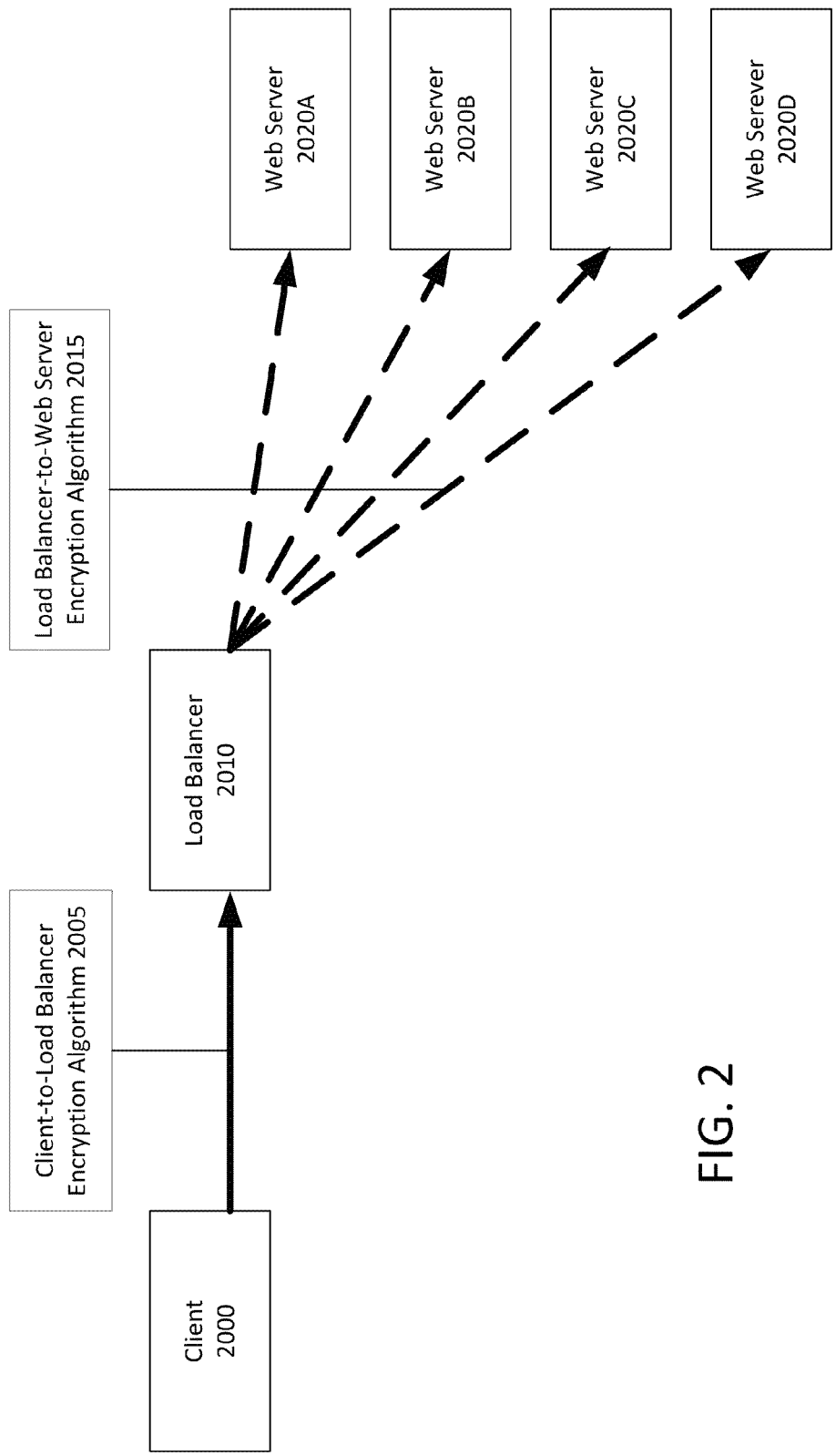
FIG. 2 is a diagram illustrating an example secure Internet-based client/server communications system in accordance with the present disclosure.

Before describing some example techniques for encryption algorithm selection, some specific examples of the more generalized system depicted in FIG. 1 will now be described in FIGS. 2 and 3. As should be appreciated, any number of additional or alternative system configurations other than those depicted in FIGS. 2 and 3 may also be employed in accordance with the present disclosure. FIG. 2 illustrates one example embodiment of a secure Internet-based client/server communications system in accordance with the present disclosure. In FIG. 2, the source is client 2000, and the destination components are web servers 2020A-D. The intermediary is load balancer 2010. Load balancer 2010 may be, for example, a load balancer proxy component. Load balancer 2010 operates to generally evenly distribute the communications load across web servers 2020A-D, though, as discussed above, there are many circumstances in which an even distribution may be undesirable. In the example of FIG. 2, Client 2000 and load balancer 2010 may communicate via, for example, a wide area network (WAN) such as the Internet or a local area network (LAN) or other network. Load balancer 2010 and web servers 2020A-D may be located in local physical proximity to one another or may be remote from one another. If local to one another, load balancer 2010 and web servers 2020A-D may, for example, communicate via a LAN. If remote from one another, load balancer 2010 and web servers 2020A-D may, for example, communicate via a WAN such as the Internet.

In the example of FIG. 2, client 2000, load balancer 2010 and web servers 2020A-D may, for example, communicate using TLS/SSL protocol. Additional or alternative communication protocols may also be employed. In response to receiving a communications request for the source 2000, the load balancer 2010 may select a particular web server 2020A-D to handle the communications from the source. The particular web server may be selected based on load balancing and any number of additional factors. The load balancer 2010 may select a client-to-load balancer encryption algorithm 2005 to encrypt communications between client 2000 and load balancer 2010. The load balancer 2010 may also select a load balancer-to-web server encryption algorithm 2015 to encrypt communications between load balancer 2010 and web servers 2020A-D. The encryption algorithms 2005 and 2015 may be selected according to one or more of the encryption algorithm selection techniques that will be described in detail below.

Figure 3:
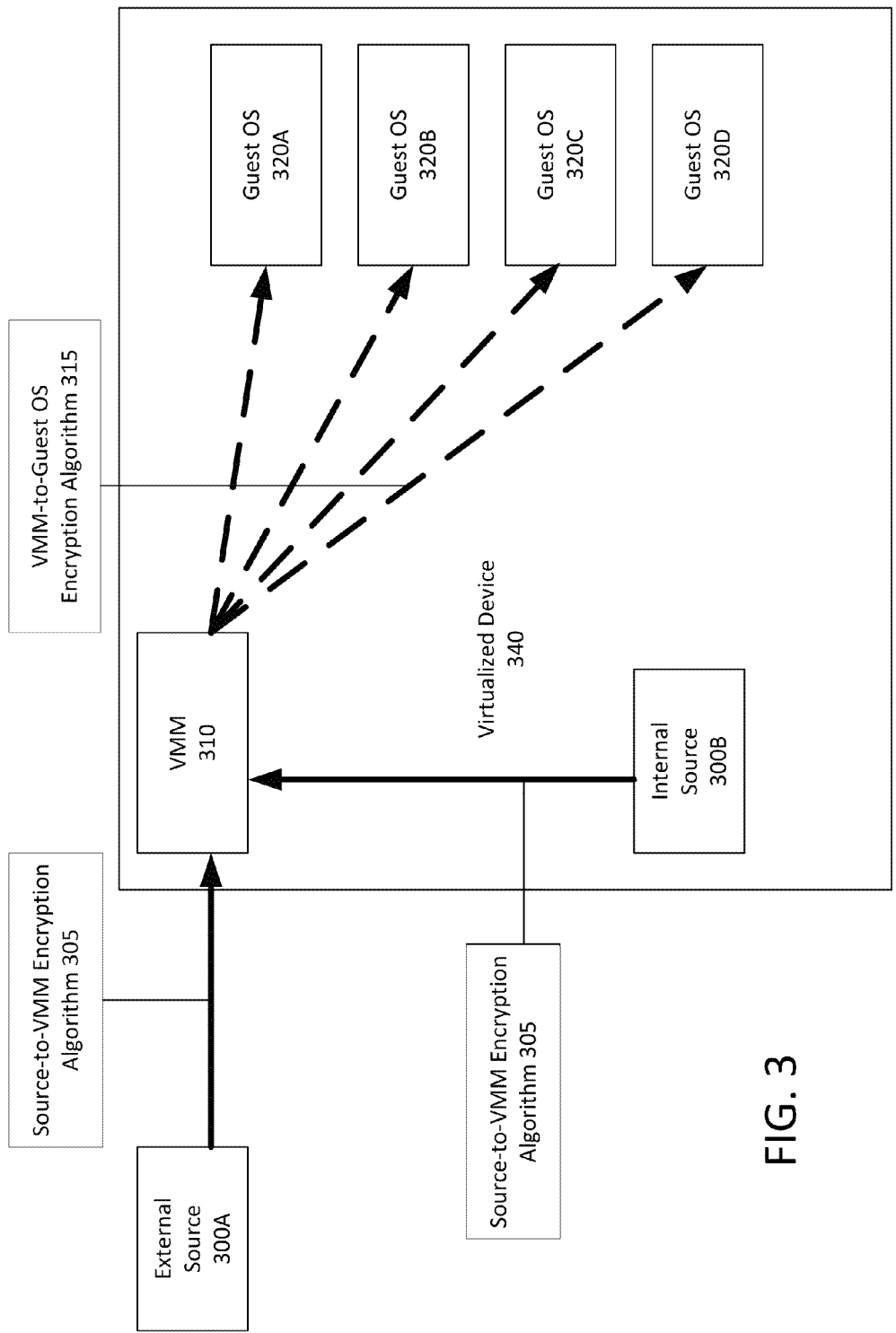
FIG. 3 is a diagram illustrating an example secure virtual communications system in accordance with the present disclosure in accordance with the present disclosure.

Another example system in which the disclosed techniques may be employed is depicted in FIG. 3. In particular, FIG. 3 illustrates one example embodiment of a secure virtual communications system in accordance with the present disclosure. In FIG. 3, the destination components are guest operating systems (OS's) 320A-D, and the intermediary is virtual machine manager (VMM) 310. Guest OS's 320A-D may form or be referred to as one or more "virtual machines." VMM 310 may be, for example, a hypervisor or any other component that serves to manage execution of virtual machines and/or guest OS's on a virtualized device 340. The source may be an external source 300A, which is external to virtualized device 340, or an internal source 300B, which is internal to virtualized device 340. Internal source 300B may be, for example, a component executing within a host OS or possibly even within another Guest OS 320A-D. External source 300A and virtualized device 340 may be located in local physical proximity to one another or may be remote from one another. If local to one another, external source 300A and virtualized device 340 may, for example, communicate via a LAN. If remote from one another, external source 300A and virtualized device 340 may, for example, communicate via a WAN such as the Internet.

In some cases, in response to receiving a communications request from a source 300, the VMM 310 may select a particular Guest OS 220A-D to handle the communications from the source. In some cases, however, the communications may be pre-directed by the source 300 to a particular Guest OS 320. Additionally, in some cases, only a single Guest OS 320 may be capable of handling the communications. The VMM 310 may select a source-to-VMM encryption algorithm 305 to encrypt communications between source 300 and VMM 310. The VMM 310 may also select a VMM-to-Guest OS encryption algorithm 315 to encrypt communications between VMM 310 and a selected Guest OS 320. The encryption algorithms 305 and 315 may be selected according to one or more of the encryption algorithm selection techniques that will be described in detail below.

Figure 4:
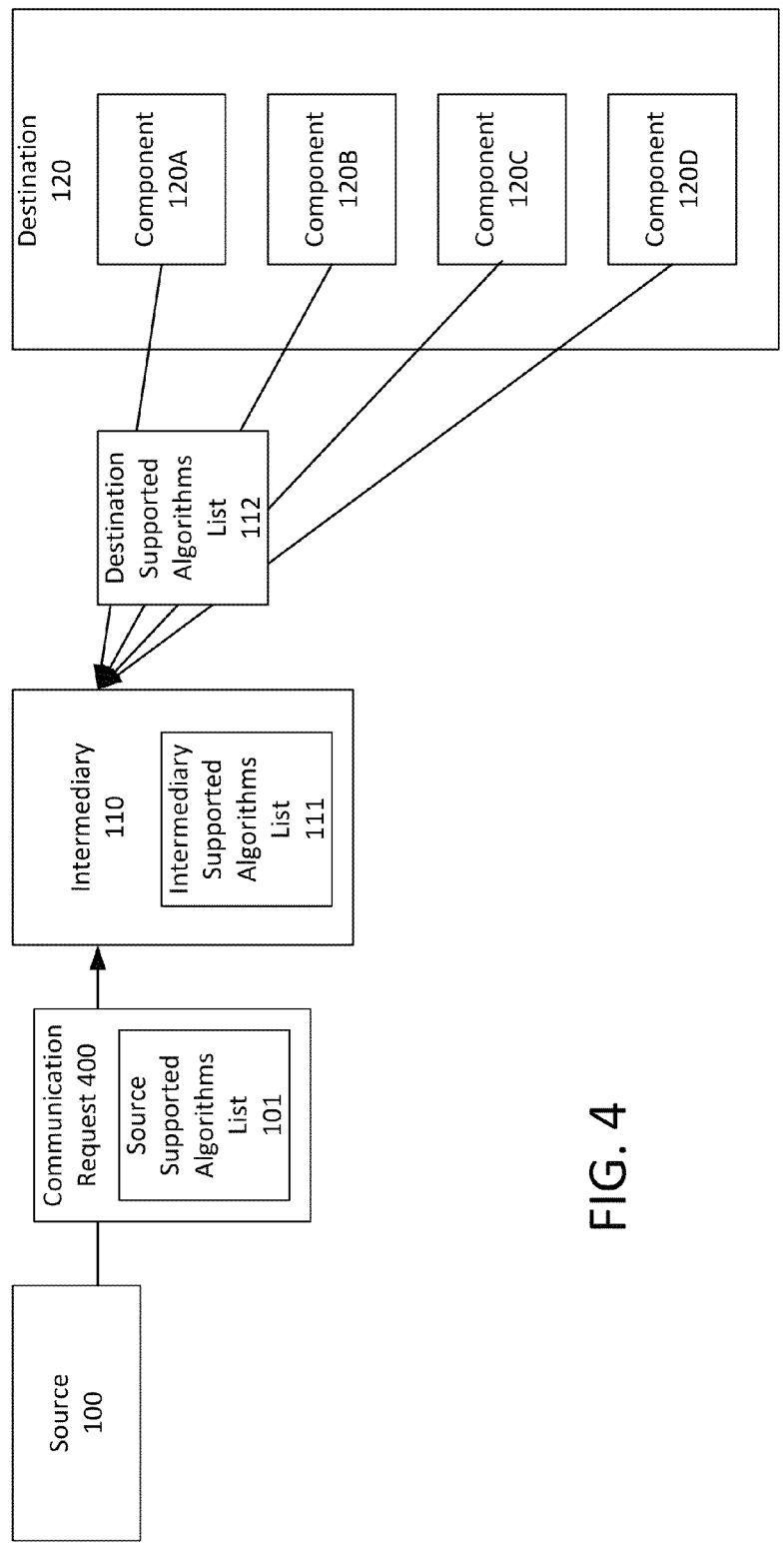
FIG. 4 is a diagram illustrating example encryption algorithm selection components in accordance with the present disclosure.

FIG. 4 is a diagram illustrating example encryption algorithm selection components in accordance with the present disclosure. As shown, FIG. 4 includes a source-supported algorithms list 101, an intermediary source-supported algorithms list 111 and a destination-supported algorithms list 112. Each such list includes and identifies the encryption algorithms supported by each respective component. Destination supported algorithms list 112 may be divided into separate portions each corresponding to a respective destination component. In some cases, each of the destination components may support the same encryption algorithms and, therefore, separate portions for separate components may be unnecessary.

Each of the supported encryption algorithm lists 101, 111 and 112 may indicate an order of preference associated with each of the encryption algorithms. The order of preference of each encryption algorithm may be determined based upon any number of factors with a variety of respective weights. Such factors may include, for example, a measured and/or expected efficiency, speed, cost, bandwidth and processing power associated with employing each of the encryption algorithms by the respective components or devices. Such factors may also include, for example, a measured and/or expected cost, difficulty and time required by an unauthorized party to neutralize each encryption algorithm and access the encrypted communications. As an example, in some cases, techniques that are expected to require the least amount of processing power while also requiring the most difficulty to decrypt may tend to be the most preferred techniques. The factors and associated weights used to determine the order of preference may be the same or different for each of the lists 101, 111 and 112.

Each of the supported encryption algorithm lists 101, 111 and 112 may be generated by, or generated based on information provided by, any or all of source 100, intermediary 110 and destination 120. Additionally or alternatively, each of the supported encryption algorithm lists 101, 111 and 112 may be generated by, or generated based on information provided by, additional services, components or devices with any relevant information that can be used to generate such lists. As another example, in some cases, the source 100 or destination 120 or another component may simply identify hardware components included within or associated with the source 100 or the destination 120, and one or more of the lists 101, 111 and 112 may be compiled by the intermediary 110 or another component based on this hardware information. For example, the intermediary 110 or another component may have access to information that specifies which encryption algorithms are best suited for use with various hardware components. Similarly, a destination component can run a benchmarking procedure that tests the component's ability to encrypt and/or decrypt data using different encryption algorithms and use the results of the procedure to generate its list. In an example embodiment, the component could run such a benchmark when it comes online, according to a schedule, or in response to a request to run a benchmark from another component, such as the intermediary 110.

Each of the supported encryption algorithm lists 101, 111 and 112 may be organized according to any desired format or order. For example, each of the supported encryption algorithm lists 101, 111 and 112 may be ordered such that the most preferred encryption algorithm is placed at the top of the list, with the remaining encryption algorithms listed from the top down according to their respective order of preference.

In addition to supported encryption algorithm lists 101, 111 and 112, FIG. 4 also depicts a communication request 400, which is a request that may be issued by source 100 in order to initiate communications with the destination 120. In the example of FIG. 4, the request 400 includes the source-supported algorithms list 101. The request 400 may also include other information about the desired communications. For example, the request 400 may identify the desired destination 120 and, in some cases, may even identify a selected destination component 120A-D. The request may also, for example, provide indications of the size, type, format, urgency and/or any other attribute of the data to be communicated to the destination.

While the source-supported algorithms list may be sent to the intermediary by way of the communications request 400, different techniques may be employed to deliver the destination-supported algorithms list 112 to intermediary 110. For example, in one embodiment, upon receiving the communications request 400, the destination-supported algorithms list 112 may be generated "on-the-fly" by having the intermediary 110 request the supported encryption algorithm information from one or more destination components 120A-D.

In another embodiment, the destination-supported algorithm list 112 may be a pre-existing list that is stored and maintained by intermediary 110. In some cases, information for such a pre-existing list may be "pulled" by intermediary 110 by having the intermediary 110 request the information from the destination 120. In other cases, information for a pre-existing list may be "pushed" to intermediary 110 by having the destination 120 provide the information to the intermediary 110 without being triggered by the intermediary 110. In yet other cases, a combination of both pushing and pulling techniques may be used to compile and maintain a pre-existing list.

A pre-existing list may be generated by the intermediary 110 whenever it becomes connected to one or more destination components. Specifically, upon being connected, the intermediary 110 may request a list of supported encryption algorithms from each connected destination component. Additionally, a pre-existing list may be updated whenever a destination component is connected to or disconnected from the intermediary 110. A pre-existing list may also be updated periodically by receiving updates from the destination components 120A-D using pushing and/or pulling techniques. The periodic updates may be at regular or varying intervals.

Furthermore, a destination component 120A-D may notify the intermediary whenever the destination component detects that a change to the destination-supported algorithm list 112 may be necessary. For example, this may occur when the destination component 120A-D becomes capable of supporting a new algorithm or loses the capability to support an algorithm. This may also occur when, for example, the destination component 120A-D changes its preferences for support of one or more algorithms.

Referring back to FIG. 4, upon receiving communications request 400 from source 100, intermediary 110 may, if necessary, select a particular destination component 120A-D to which to direct the requested communications. The intermediary 110 may also select source-to-intermediary and intermediary-to-destination encryption algorithms with which to encrypt the requested communications. As will be described in detail below, depending upon various priorities, the destination component 120A-D may be selected before, after or simultaneously with the selection of the encryption techniques.

For example, in some cases, a destination component 120A-D may be selected first, and the encryption techniques may then be selected based on the encryption algorithms supported by the selected destination component. In these cases, the destination component may be selected based on factors other than supported encryption algorithms. These other factors may include factors set forth above such as load balancing. As another example, in some other cases, the encryption algorithms that are supported by each destination component may be evaluated and used to simultaneously select both a destination component and the encryption techniques for use with the selected destination component.

Some example techniques for source-to-intermediary and intermediary-to-destination encryption algorithm selection will now be described in detail. In general, the encryption algorithms may be selected based on an evaluation of supported algorithm lists 101, 111 and 112. Once again, depending upon varying priorities, the source-to-intermediary encryption algorithm may be selected before, after or simultaneously with the intermediary-to-destination encryption algorithm. Some example techniques for selection of the source to-intermediary encryption algorithm will be described first. In some rare cases, source 100 and intermediary 110 may not have any common supported encryption algorithms. In these cases, intermediary 110 may respond to the communications request from source 100 by sending an error message back to source 100 or by otherwise informing source 100 that source 100 and intermediary 110 have no common supported encryption algorithms. In other cases, source 100 and intermediary 110 may have only a single common supported encryption algorithm. In such cases, the single common supported encryption algorithm may be selected with no or minimal required decisions.

In other scenarios, however, there may be two or more common supported encryption algorithms available for use between source 100 and intermediary 110. In such cases, the decision of which common supported encryption algorithm to employ as the source-to-intermediary encryption algorithm may be based on any number of relevant priorities with various possible respective weights. Some such priorities may include, for example, selecting an encryption technique that is more preferred by the source, selecting an encryption technique that is more preferred by the intermediary, and selecting an encryption technique that is more preferred across the source and the intermediary together (i.e., lowest average rank). In some circumstances, the encryption algorithms supported by the destination may also be given at least some priority in selecting the source-to-intermediary encryption algorithm.

Some example techniques for selection of the intermediary-to-destination encryption algorithm will now be described. In some rare cases, intermediary 110 and destination 120 may not have any common supported encryption algorithms. In these cases, intermediary 110 may respond to the communications request from source 100 by sending an error message back to source 100 or by otherwise informing source 100 that the intermediary 110 and the destination 120 have no common supported encryption algorithms. In other cases, intermediary 110 and a selected destination component 120A-D may have only a single common supported encryption algorithm. In such cases, the single common supported encryption algorithm may be selected with no or minimal required decisions.

In other scenarios, however, there may be two or more common supported encryption algorithms available for use between source 100 and a selected destination component 120A-D. In such cases, the decision of which common supported encryption algorithm to employ as the intermediary-to-destination encryption algorithm may be based on any number of relevant priorities with various possible respective weights. Such priorities and weights may be the same as or different from the priorities and weights used to select the source-to-intermediary encryption algorithm. Such priorities may include, for example, selecting an encryption technique that is more preferred by the destination, selecting an encryption technique that is more preferred by the intermediary, and selecting an encryption technique that is more preferred across the intermediary and destination together (i.e., lowest average rank). In some circumstances, the encryption algorithms supported by the source may also be given at least some priority in selecting the source-to-intermediary encryption algorithm.

A number of example scenarios for encryption algorithm selection are depicted in FIGS. 5-11. It should be emphasized that the scenarios depicted in FIGS. 5-11 are intended for example purposes only and that, in practice, the disclosed techniques may be employed in connection with any number of additional or alternative scenarios with varying levels of complexity. It should also be emphasized that the selected priorities depicted in FIGS. 5-11 and their corresponding application are also intended for example purposes only, and any number of additional or alternative selection priorities and corresponding applications may also be employed with varying levels of complexity in accordance with the present disclosure.

Referring first to FIG. 5, an example source-supported encryption algorithm list 101, intermediary-supported encryption algorithm list 111, and destination-supported encryption algorithm list 112 are depicted. Each such list includes the encryption algorithms supported by each respective device or component. As shown, FIG. 5 depicts an example scenario in which the source supports two encryption algorithms (S and X), while the intermediary and the destination both support five encryption algorithms (S, A, B, I and D). Each of the lists 101, 111 and 112 ranks the supported encryption algorithms in order of preference from the top down. For example, algorithm S is the most preferred algorithm by the source, algorithm I is the most preferred algorithm by the intermediary and algorithm D is the most preferred algorithm by the destination.

In the example of FIG. 5, as shown in selected source-to-intermediary encryption algorithm box 105, algorithm S is chosen as the selected source-to-intermediary encryption algorithm, as it is the only common algorithm supported by both the source and the intermediary. In this example, however, there are multiple common algorithms supported by both the intermediary and the destination, each with differing orders of preference. Thus, a decision must be made of which of the common algorithms to choose as the selected intermediary-to-destination algorithm.

There are a number of trade-offs associated with this decision. For example, employing algorithm D as the selected intermediary-to-destination algorithm may be beneficial because it is the algorithm most preferred by the destination. This may, for example, reduce processing power required by the destination. As another example, employing algorithm I as the selected intermediary-to-destination algorithm may be beneficial because it is the algorithm most preferred by the intermediary. This may, for example, reduce processing power required by the intermediary.

As another example, employing algorithm A as the selected intermediary-to-destination algorithm may be beneficial because it has the lowest total ranking across both the intermediary and the destination. Thus, although algorithm A is not most preferred by any particular single component, it may be the most efficient algorithm for the intermediary and destination to employ collectively.

As yet another example, employing algorithm S as the selected intermediary-to-destination algorithm may be beneficial because it is also being used as the selected source-to-intermediary algorithm. Thus, if algorithm S were also to be used as the intermediary-to-destination algorithm, this might allow the communication to pass through the intermediary without needing to be decrypted from algorithm S and then re-encrypted using algorithm D. Thus, algorithm S may be the most efficient component for the source, intermediary and destination to employ collectively.

In the particular example of FIG. 5, as shown in priorities box 500, a priority has been set for choosing the intermediary-to-destination encryption algorithm based on the preferred destination algorithm. Thus, as shown in selected intermediary-to-destination encryption algorithm box 115, algorithm D is chosen as the selected intermediary-to-destination encryption algorithm because it is most preferred algorithm by the destination.

FIG. 6 depicts the same example as FIG. 5, with the exception that, as shown in priorities box 600, the priority has been set for choosing the intermediary-to-destination encryption algorithm based on the preferred intermediary algorithm. Thus, as shown in selected intermediary-to-destination encryption algorithm box 115, algorithm I is chosen as the selected intermediary-to-destination encryption algorithm because it is most preferred algorithm by the intermediary.

FIG. 7 depicts the same example as FIGS. 5 and 6, with the exception that, as shown in priorities box 700, the priority has been set for choosing the intermediary-to-destination encryption algorithm based on the preferred algorithm across the intermediary and destination together (i.e., lowest average rank). Thus, as shown in selected intermediary-to-destination algorithm box 115, algorithm A is chosen as the selected intermediary-to-destination encryption algorithm because it is has the lowest average ranking across the intermediary and destination together.

FIG. 8 depicts the same example as FIGS. 5-7, with the exception that, as shown in priorities box 800, the priority has been set for minimizing the amount of encryption/decryption operations across all three components (i.e., source, intermediary and destination). Thus, as shown in selected intermediary-to-destination encryption algorithm box 115, algorithm S is chosen as the selected intermediary-to-destination encryption algorithm because it is the only algorithm common to all three components.

Figure 9:
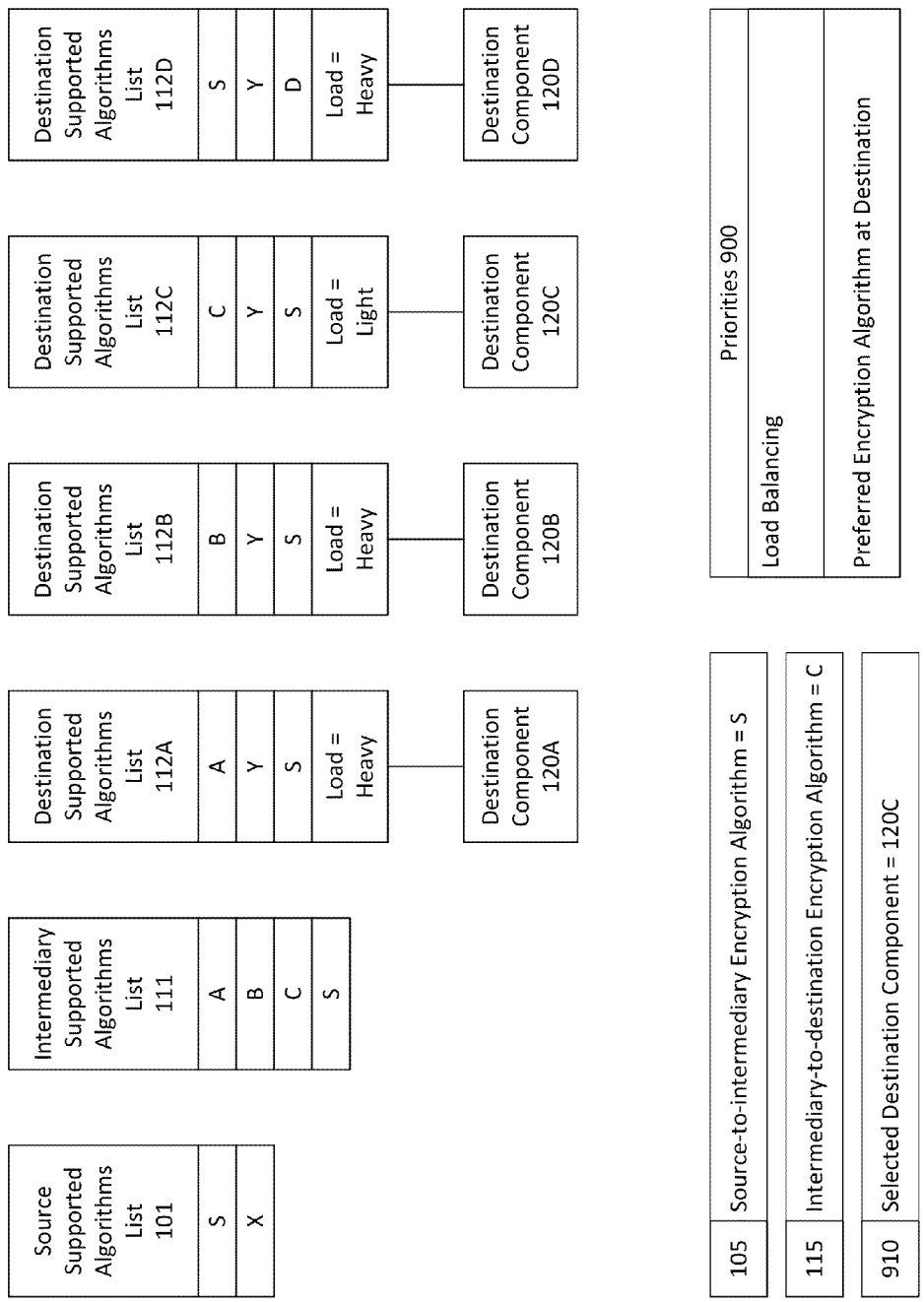
FIG. 9 is a diagram illustrating another example encryption algorithm selection scenario in accordance with the present disclosure.
Figure 10:
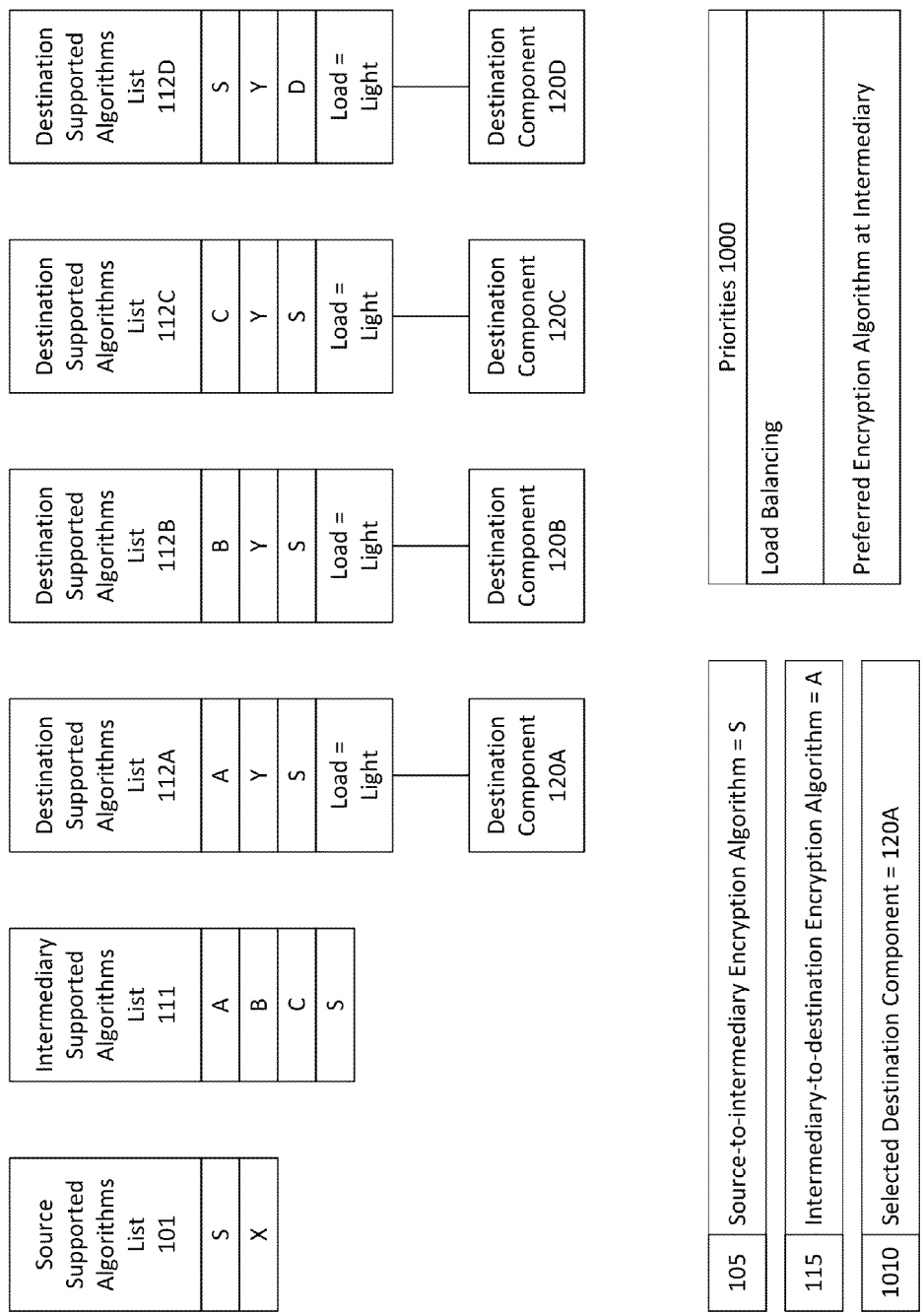
FIG. 10 is a diagram illustrating another example encryption algorithm selection scenario in accordance with the present disclosure.
Figure 11:
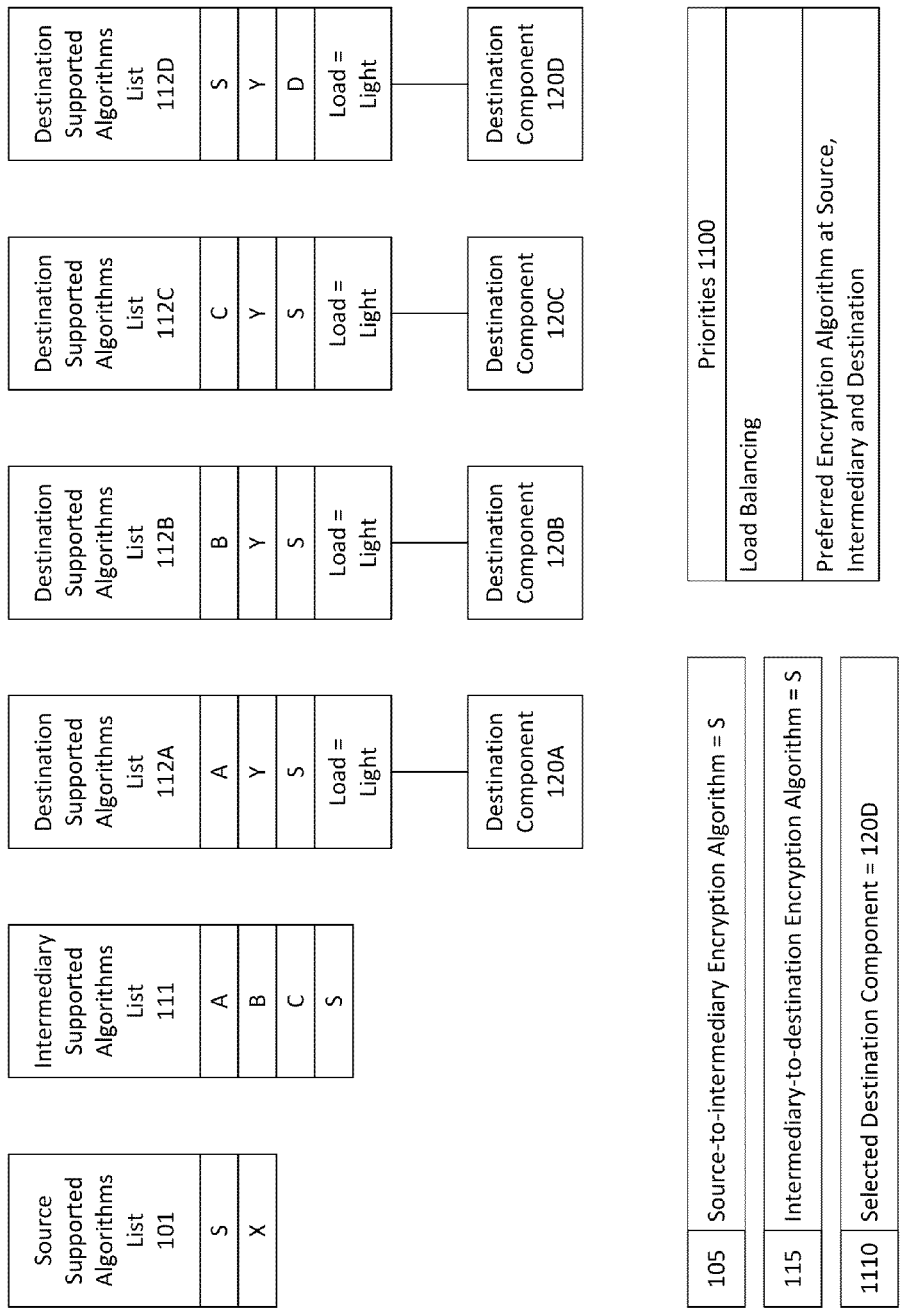
FIG. 11 is a diagram illustrating another example encryption algorithm selection scenario in accordance with the present disclosure.

FIGS. 9-11 depict a slightly different scenario than those depicted in FIGS. 5-8. In particular, FIGS. 9-11 depict four destination component-supported encryption algorithm lists 112A-D each corresponding to a respective destination component 120A-D. As indicated by the component lists 112A-D, each of the destination components 120A-D support different encryption algorithms with different orders of preference. An example relative traffic and/or processing load on each of the destination components 120A-D is also indicated underneath each of the respective component lists. The relative traffic load is merely depicted within these lists as a matter of convenience to clearly convey this concept to the reader and need not necessarily be included as part of such lists in practice.

In the particular example of FIG. 9, the load on components 120A, B and D is heavy, while the load on component 120D is light. Additionally, FIG. 9 depicts the example scenario in which there are two selection priorities shown in their order of importance. Load balancing is listed as the top priority. Also, the preferred destination algorithm is listed as the second priority. In this case, component 120C has the lightest load. Thus, because load balancing is top priority, component 120C is chosen as the selected destination component as indicated in box 910. Additionally, encryption algorithm C is the algorithm that is most preferred by component 120C. Thus, because the preferred destination algorithm is the next priority, algorithm C is selected as the intermediary-to-destination encryption algorithm as shown in box 115.

FIG. 10 depicts the same example as FIG. 9 with a few exceptions. First, the load has changed such that it is now light at each destination component 120A-D. Additionally, the priorities have changed. Specifically, as shown in priorities box 1000, load balancing is still the top priority, but the secondary priority has been set to the preferred algorithm at the intermediary. In this example, since the load is relatively evenly distributed, the component is not selected based on load. Thus, consideration moves to the secondary priority as a "tiebreaker." Here, it is determined that both the intermediary and component 120A share algorithm A as their most preferred encryption algorithm. Thus, component 120A is chosen as the selected destination component as shown in box 1010. Additionally, algorithm A is selected as the intermediary-to-destination encryption algorithm as shown in box 115.

FIG. 11 depicts the same example as FIG. 10 with the exception that, as shown in priorities box 1100, the secondary priority has been set to the preferred algorithm common to the source, intermediary and destination. As in FIG. 10, since the load is relatively evenly distributed, the component is not selected based on load. Thus, consideration once again moves to the secondary priority as a "tiebreaker." Here, it is determined that the only algorithm common to the source, intermediary and the destination components is algorithm S. Thus, algorithm S is selected as the intermediary-to-destination encryption algorithm as shown in box 115. Additionally, it is determined that component 120D has algorithm S as its most preferred encryption algorithm. Thus, component 120D is chosen as the selected destination component as shown in box 1110.

Figure 12:
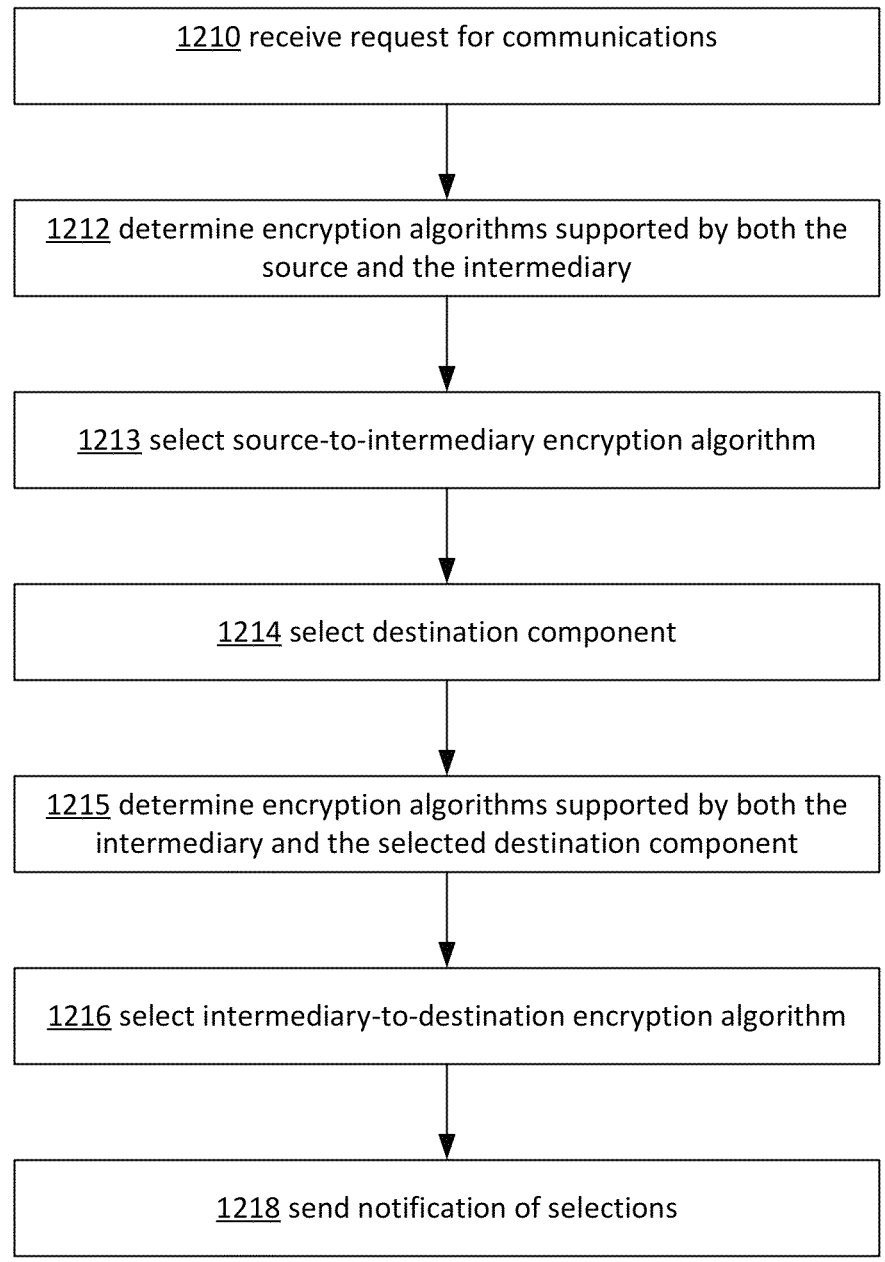
FIG. 12 is a flowchart depicting an example procedure for assignment of encryption algorithms in accordance with the present disclosure.

FIG. 12 is a flowchart depicting an example procedure for assignment of encryption algorithms in accordance with the present disclosure. At operation 1210, a communications request is received. The request may be issued by a source to initiate communications with a specified destination. The destination may include one or more destination components that are available to receive and handle the requested communications. The communications request may include a source supported algorithms list, which specifies encryption algorithms supported by the source. The communications request need not necessarily be received directly from the source, and various information may be added to or removed from the request or may be re-formatted or re-arranged within the request prior to being received at operation 1210.

At operation 1212 one or more encryption algorithms supported by both the source and the intermediary are determined. This determination may, for example, be made by examining and comparing a source-supported algorithms list, which specifies encryption algorithms supported by the source, and an intermediary-supported algorithms list, which specifies encryption algorithms supported by the intermediary. The source-supported algorithms list may, for example, be provided as part of the communications request received at operation 1210, while the intermediary-supported algorithms list may, for example, be stored and maintained by the intermediary.

At operation 1213 a source-to-intermediary encryption algorithm is selected. The source-to-intermediary encryption algorithm may be selected from one of the common algorithms supported by both the source and destination determined at operation 1212. As set forth in detail above, the source-to-intermediary encryption algorithm may be selected based on factors such as, for example, a determination of which encryption algorithms are best supported by the source and the intermediary collectively or individually. The selection may also be based upon any other relevant factors with any appropriate respective weights. For example, a determination of which encryption algorithms are best supported by the destination may also be considered.

At operation 1214, a selected destination component is determined to receive the communications from the source. As set forth in detail above, the selected destination component may be determined based on factors such as load balancing or any number of other relevant factors with any appropriate respective weights. In some cases, a selection may be unnecessary, such as when the destination includes only a single component or when a particular destination is pre-selected by the source and identified in the communications request.

At operation 1215 one or more encryption algorithms supported by both the intermediary and the selected destination component are determined. This determination may, for example, be made by examining and comparing an intermediary-supported algorithms list, which specifies encryption algorithms supported by the intermediary, and a destination-supported algorithms list, which specifies encryption algorithms supported by the selected destination component. As set forth above, the destination-supported algorithms list may, for example, be generated "on-the-fly" in response to receiving the communications request or may, for example, be a pre-compiled, stored list that may be maintained by the intermediary using techniques such as the examples set forth above.

At operation 1216 an intermediary-to-destination encryption algorithm is selected. The intermediary-to-destination encryption algorithm may be selected before, after or simultaneously with the source-to-intermediary encryption algorithm. The intermediary-to-destination encryption algorithm may be the same as or different from the source-to-intermediary encryption algorithm. The source-to-intermediary encryption algorithm may be selected based on factors such as, for example, a determination of which encryption algorithms are best supported by the intermediary and the destination collectively or individually. The selection may also be based upon any other relevant factors with any appropriate respective weights. For example, a determination of which encryption algorithms are best supported by the source may also be considered.

The destination component selection of operation 1214 may be performed before, after or simultaneously with the encryption algorithm related operations 1212, 1213, 1215 and 1216. As set forth in detail above, in some cases, the destination component may even be selected based upon a determination of which encryption algorithms are supported by the source, intermediary and destination.

At operation 1218, one or more notifications of the selections made during any or all of operations 1212, 1214 and 1216 are issued. Such notifications may include, for example, notifying the source of the selected source-to-destination encryption algorithm. Additionally, for example, the selected destination component may be notified of its selection to receive communications from the source and also the selected intermediary-to-destination encryption algorithm. The notifications may be made directly or indirectly through intermediate components. For example, in some cases, the intermediary may send separate notifications to the source and the destination. In other cases, the intermediary may send a single notification to the destination, and the destination may then forward any necessary notifications to the source.

Figure 13:
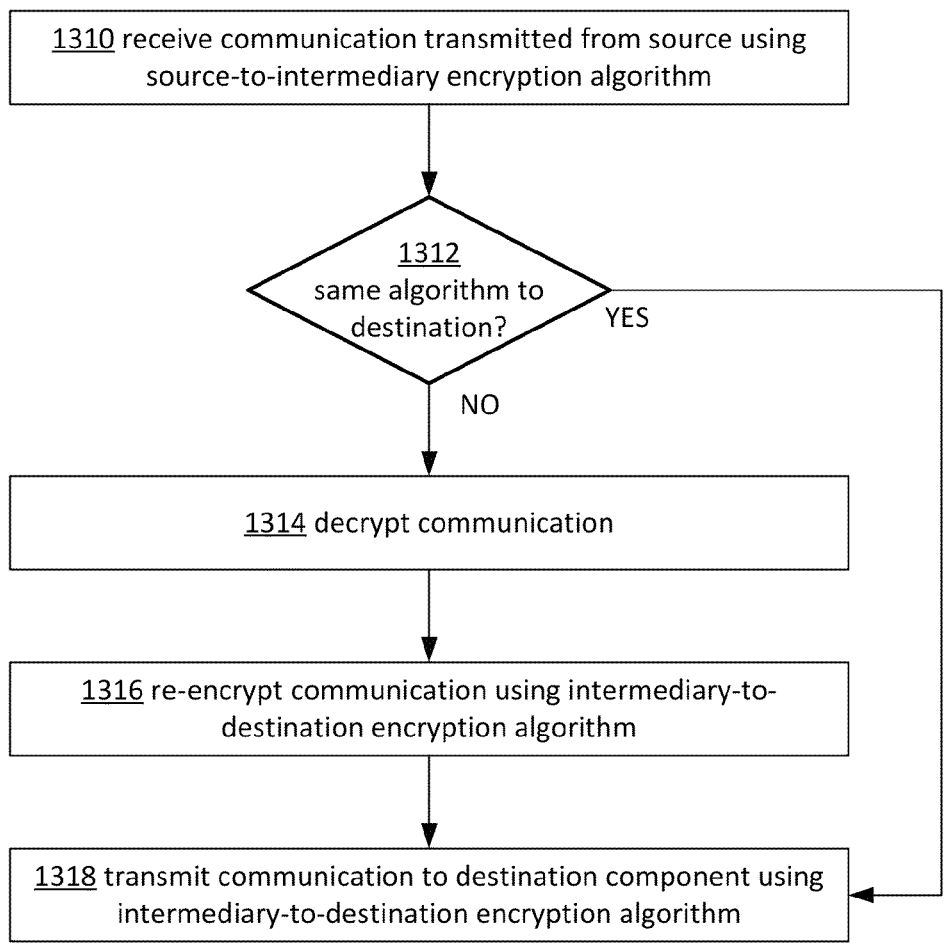
FIG. 13 is a flowchart depicting an example procedure for performing encrypted communications in accordance with the present disclosure.

After performance of selection techniques such as those depicted in FIG. 12, the requested encrypted communications may then be performed. In particular, FIG. 13 is a flowchart depicting an example procedure for performing encrypted communications in accordance with the present disclosure. At operation 1310, the intermediary receives the requested encrypted communication from the source. The communication will be encrypted using the selected source-to-intermediary encryption algorithm. At operation 1312, it is determined whether the selected intermediary-to-destination encryption technique for the received communication is the same as or different from the source-to-intermediary encryption algorithm. If the selected encryption algorithms are the same, then, at operation 1318, the intermediary transmits the incoming communication along to the selected destination component without changing the encryption algorithm.

If, on the other hand, selected encryption algorithms are different, then, at operation 1314, the intermediary decrypts the incoming communication from the source. Then, at operation 1316, the intermediary re-encrypts the communication using the selected intermediary-to-destination encryption algorithm. Finally, at operation 1318, the intermediary transmits the incoming communication along to the selected destination component using the selected intermediary-to-destination encryption algorithm.

Figure 14:
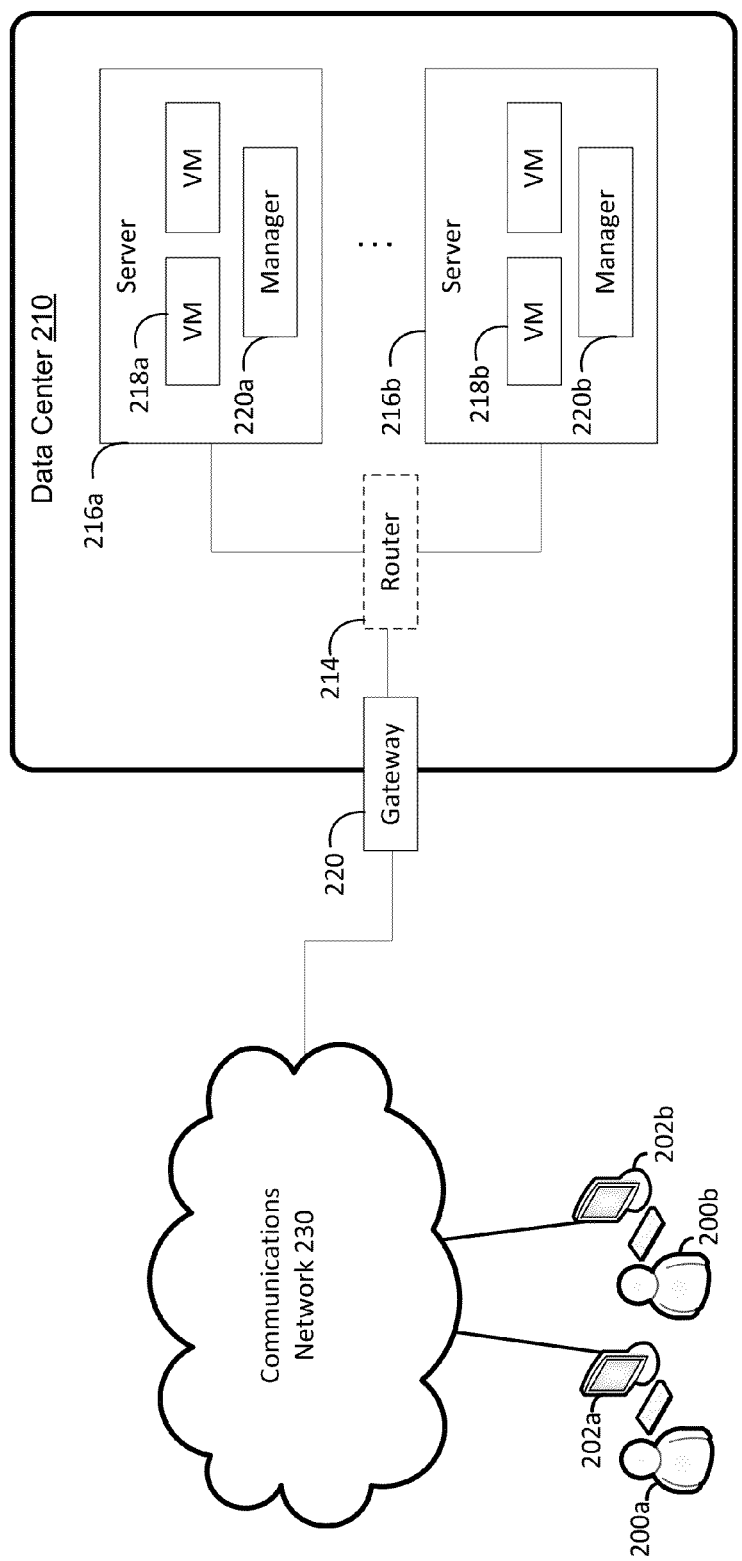
FIG. 14 is a block diagram illustrating an example computer system that may be used in some embodiments.

FIG. 14 illustrates an example computing environment in which the embodiments described herein may be implemented. FIG. 14 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources—consisting of many processors, large amounts of memory, and/or large storage capacity—and small resources—consisting of fewer processors, smaller amounts of memory, and/or smaller storage capacity. Customers may choose to allocate a number of small processing resources as Web servers and/or one large processing resource as a database server, for example.

Data center 210 may include servers 216a-b (which may be referred herein singularly as 'a server 216' or in the plural as 'the servers 216)" that provide computing resources available as virtual machine instances 218a-b (which may be referred herein singularly as "a virtual machine instance 218" or in the plural as "the virtual machine instances 218"). The virtual machine instances 218 may be configured to execute applications, including Web servers, application servers, media servers, database servers, and the like. Other resources that may be provided include data storage resources (not shown), and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMW or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 14, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 14 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 14, a router 214 may be utilized to interconnect the servers 216a and 216b. Router 214 may also be connected to gateway 220, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that data center 210 described in FIG. 14 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of secure communication of data from a source to a destination through an intermediary, the method comprising:
    selecting, based at least in part on a list of source-supported encryption algorithms that is provided by the source to the intermediary, a source-to-intermediary encryption algorithm with which to encrypt the data for transmission from the source to the intermediary;
    selecting, from a plurality of available destination components associated with the destination, a particular destination component to which to transmit the data, wherein the particular destination component is selected based, at least in part, on destination-supported encryption algorithms listed in a plurality of ranked lists of destination-supported encryption algorithms associated with the plurality of available destination components;
    selecting, based at least in part on a particular ranked list of destination-supported encryption algorithms associated with the particular destination component, an intermediary-to-destination encryption algorithm with which to encrypt the data for transmission from the intermediary to the particular destination component, wherein the source-to-intermediary encryption algorithm and the intermediary-to-destination encryption algorithm are different encryption algorithms;
    sending, to the source, a notification that identifies the source-to-intermediary encryption algorithm;
    receiving, by the intermediary, the data transmitted from the source and encrypted using the source-to-intermediary encryption algorithm;
    decrypting, by the intermediary, the data from the source;
    re-encrypting, by the intermediary, the data using the intermediary-to-destination encryption algorithm; and
    transmitting, by the intermediary, the re-encrypted data to the particular destination component.

2. The method of claim 1, wherein the particular ranked list of destination-supported encryption algorithms is ranked based, at least in part, on one or more preferences associated with the particular destination component.

3. The method of claim 1, further comprising:
receiving, by the intermediary, an indication of one or more hardware components associated with the particular destination component; and
generating, by the intermediary, the particular ranked list of destination-supported encryption algorithms based, at least in part, on the one or more hardware components.

4. The method of claim 1, wherein the source is a client, the intermediary is a load balancer, and the particular destination component is a server.

5. The method of claim 1, wherein the particular destination component is a virtual machine and the intermediary is a virtual machine manager.

6. One or more non-transitory computer-readable storage media having collectively stored thereon instructions that, upon execution by one or more processors of a computer system, cause the computer system to at least:
select, based at least in part on a list of source-supported encryption algorithms that is provided by a source to an intermediary, a source-to-intermediary encryption algorithm with which to encrypt data for transmission from the source to the intermediary;
select, from a plurality of available destination components associated with a destination, a particular destination component to which to transmit the data, wherein the particular destination component is selected based, at least in part, on destination-supported encryption algorithms listed in a plurality of ranked lists of destination-supported encryption algorithms associated with the plurality of available destination components;
select, based at least in part on a particular ranked list of destination-supported encryption algorithms associated with the particular destination component, an intermediary-to-destination encryption algorithm with which to encrypt the data for transmission from the intermediary to the particular destination component, wherein the source-to-intermediary encryption algorithm and the intermediary-to-destination encryption algorithm are different encryption algorithms;
send, to the source, a notification that identifies the source-to-intermediary encryption algorithm;
receive the data transmitted from the source and encrypted using a source-to-intermediary encryption algorithm;
decrypt the data from the source;
re-encrypt the data using the intermediary-to-destination encryption algorithm; and
transmit the re-encrypted data to the particular destination component.

7. The non-transitory computer-readable storage media of claim 6, wherein the particular ranked list of destination-supported encryption algorithms is ranked based, at least in part, on one or more preferences associated with the particular destination component.

8. The non-transitory computer-readable storage media of claim 6, having further stored thereon instructions that, upon execution by the one or more processors of the computer system, cause the computer system to at least:
receive, by the intermediary, an indication of one or more hardware components associated with the particular destination component; and
generate, by the intermediary, the particular ranked list of destination-supported encryption algorithms based, at least in part, on the one or more hardware components.

9. A computing system comprising a load balancer and at least one data store in communication with the load balancer, the at least one data store having stored therein computer instructions that, upon execution by the load balancer, at least cause:
selecting, based at least in part on a list of client-supported encryption algorithms that is provided by a client to the load balancer, a client-to-load balancer encryption algorithm with which to encrypt data for transmission from the client to the load balancer;
selecting, from a plurality of servers, a particular server to which to transmit the data, wherein the particular server is selected based, at least in part, on server-supported encryption algorithms listed in a plurality of ranked lists of server-supported encryption algorithms associated with the plurality of servers;
selecting, based at least in part on a particular ranked list of server-supported encryption algorithms associated with the particular server, a load balancer-to-server encryption algorithm with which to encrypt the data for transmission from the load balancer to the particular server, wherein the client-to-load balancer encryption algorithm and the load balancer-to-server encryption algorithm are different encryption algorithms;
sending, to the client, a notification that identifies the client-to-load balancer encryption algorithm;
receiving of the data transmitted from a client and encrypted using the client-to-load balancer encryption algorithm;
decrypting of the data from the client;
re-encrypting of the data using the load balancer-to-server encryption algorithm; and
transmitting of the re-encrypted data to the particular server.

10. The computing system of claim 9, wherein the particular ranked list of server-supported encryption algorithms is ranked based, at least in part, on one or more preferences associated with the particular server.

11. The computing system of claim 9, wherein the computer instructions, upon execution by the load balancer, further cause:
receiving an indication of one or more hardware components associated with the particular server; and
generating the particular ranked list of server-supported encryption algorithms based, at least in part, on the one or more hardware components.

12. The computing system of claim 9, wherein the computer instructions, upon execution by the load balancer, further cause:
determining of a first set of one or more encryption algorithms supported by both the client and the load balancer;
selecting of one encryption algorithm from the first set of encryption algorithms as the client-to-load balancer encryption algorithm;
determining of a second set of one or more encryption algorithms supported by both the load balancer and the particular server; and
selecting of one encryption algorithm from the second set of encryption algorithms as the load balancer-to-server encryption algorithm.

* * * * *